DIFFERENTIAL BRAKING SYSTEM FOR TAPE TRANSPORT MECHANISM

Filed March 15, 1962 2 Sheets-Sheet 1

INVENTORS
LAWRENCE J. SCULLY &
ARTHUR E. GRUBER
BY
Burgess, Ryan, & Hicks
ATTORNEYS

DIFFERENTIAL BRAKING SYSTEM FOR TAPE TRANSPORT MECHANISM

Filed March 15, 1962 2 Sheets-Sheet 2

INVENTORS
LAWRENCE J. SCULLY &
ARTHUR E. GRUBER
BY
Burgess, Ryan, & Hicks
ATTORNEYS United States Patent Office 3,153,515
Patented Oct. 20, 1964

3,153,515

DIFFERENTIAL BRAKING SYSTEM FOR TAPE TRANSPORT MECHANISM

Lawrence J. Scully, Bridgeport, Conn., and Arthur E. Gruber, East Rockaway, N.Y., assignors to Scully Recording Instruments Corporation, Bridgeport, Conn., a corporation of Delaware Filed Mar. 15, 1962, Ser. No. 179,943
10 Claims. (Cl. 242—55.12)

The present invention relates to a differential braking system and relates, more particularly, to an electro-mechanical system for braking a tape transport or similar mechanism.

In general, an object of the invention is to provide an electro-mechanical braking system for a tape transport or similar mechanism in which different braking forces are applied to two tape transport reels when movement of the tape is stopped.

Generally speaking, the tape transport reels of a tape transport mechanism must be braked to prevent malfunction when movement of the tape is stopped and the braking forces applied to the reels will differ, depending upon whether the particular reel is acting as a take-up reel or as a pay-off reel. Care must be exercised in the setting of the differential braking forces so that the elastic limit or breakage point of the tape record member will not be exceeded, but at the same time overrun or excess slack in the tape which is likely to cause damage or malfunction upon resumption of normal operation, must be prevented. Particularly severe conditions are encountered in stopping the tape transport mechanism following a fast rewind or advance of the tape during which the tape reels and the tape are moved at relatively high speeds.

It should also be noted that either of the tape transport reels may function as a pay-off reel or as a take-up reel, depending upon the direction in which the tape is moving, and the proper braking force must be applied to each of the reels in accordance with its particular mode of operation at the time of the brake application. As is customary, the brake acting on the pay-off reel applies a greater braking force than the brake acting on the take-up reel with difference between the braking forces being carefully regulated to prevent breakage of the tape or other malfunction.

There are several known ways of obtaining such braking action. One way is to employ band type brakes which are self-energizing in one direction of rotation and permits a certain amount of slippage in an opposite direction of rotation. Another way is to employ a differential brake such as that disclosed in United States Patent No. 2,983,339 issued May 9, 1961, to Joseph J. Neff, where the braking pressure is set by the shifting of parts within the brake under the influence of the rotating member being braked.

An object of the present invention is to provide a differential braking system for stopping movement of the tape transport reels in tape transport or similar mechanism in which the braking forces can be readily controlled.

A further object of the present invention is to provide a differential braking system for a tape transport or similar mechanism which is foolproof in its operation and which will function properly under a wide variety of operating conditions.

It is a further object of the present invention to provide a differential braking system for tape transport or similar mechanisms in which the braking forces to the tape transport reels can be readily regulated and in which the application of the brakes is automatically controlled by means of electrical circuits in accordance with the direction in which the tape is moving.

These and other objects and advantages of the invention will become more clearly apparent and will be better understood from the following description and the accompanying drawings in which.

Figure 1:
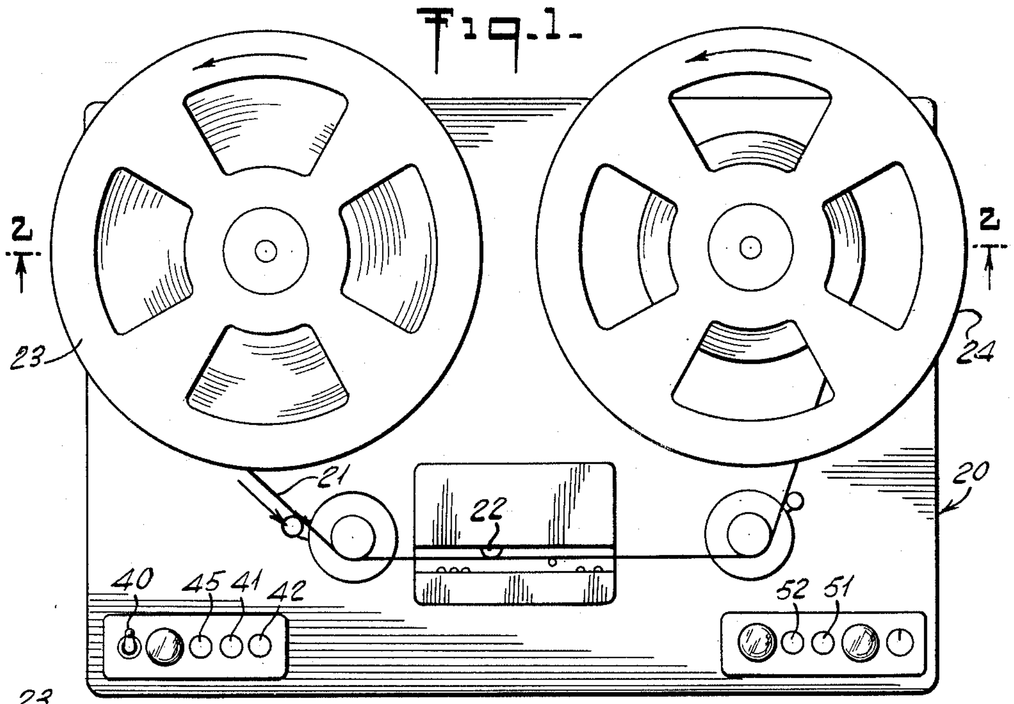
FIG. 1 is a plan view of a tape transport mechanism having a differential braking system embodying the present invention.
Figure 2:
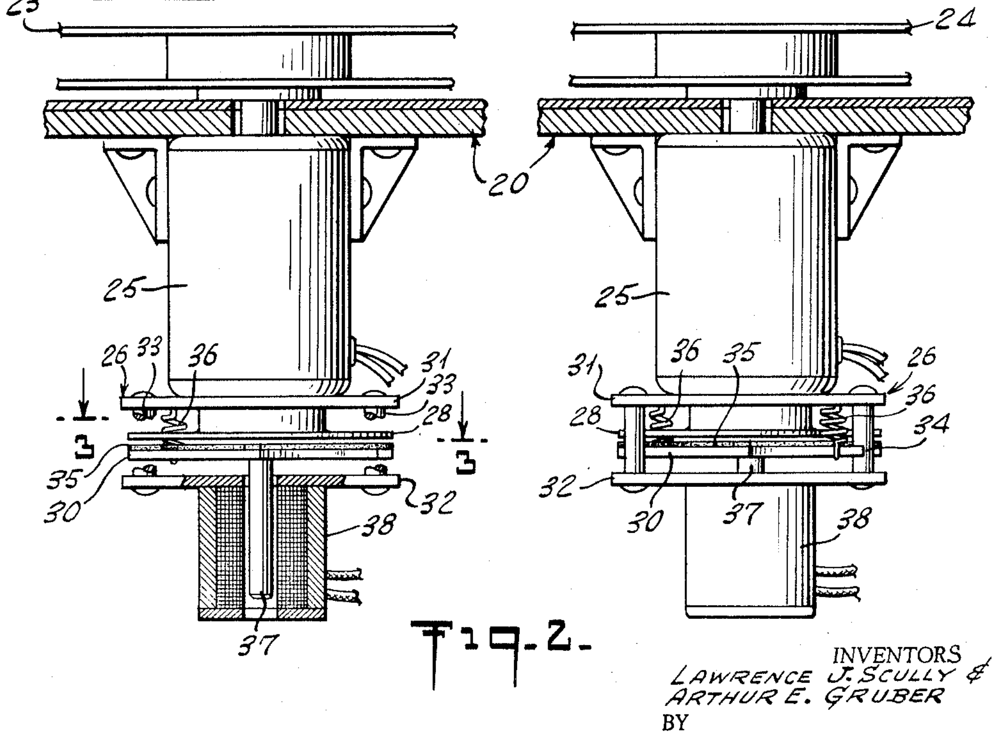
FIG. 2 is a section view taken along the line 2—2 of FIG. 1 on an enlarged scale and with certain parts being omitted for clarity.

Referring now to the drawings in detail, there is a tape transport mechanism 20 of the type in which an elongated record member 21, such as tape, is moved past a transducer 22 with the tape being unwound from one reel 23 and wound onto a second reel 24. As seen in FIG. 1, the tape is moving from left to right and under these conditions, the first reel is acting as a pay-off reel and the second reel is acting as a take-up reel. However, it will be understood that these conditions may be reversed as desired.

Each of the transport reels is connected to a motor 25 which is employed to drive the reel in an appropriate direction and at the proper speed during normal operating conditions (playing or recording) and during fast rewind or advance. In this connection, it should be noted that under fast rewind or advance conditions, the tape is moved solely by the reel motors and it is moved at relatively high speed as compared to normal operating speeds.

When movement of the tape is stopped, the reels must be braked in such a way as to prevent excessive overrun of the tape. In accordance with the present invention, each of the reels motors is provided with an electromagnetically operated brake mechanism 26 which can be operated to apply the different braking forces to the reel motor as required.

Figures 3, 4, 5:
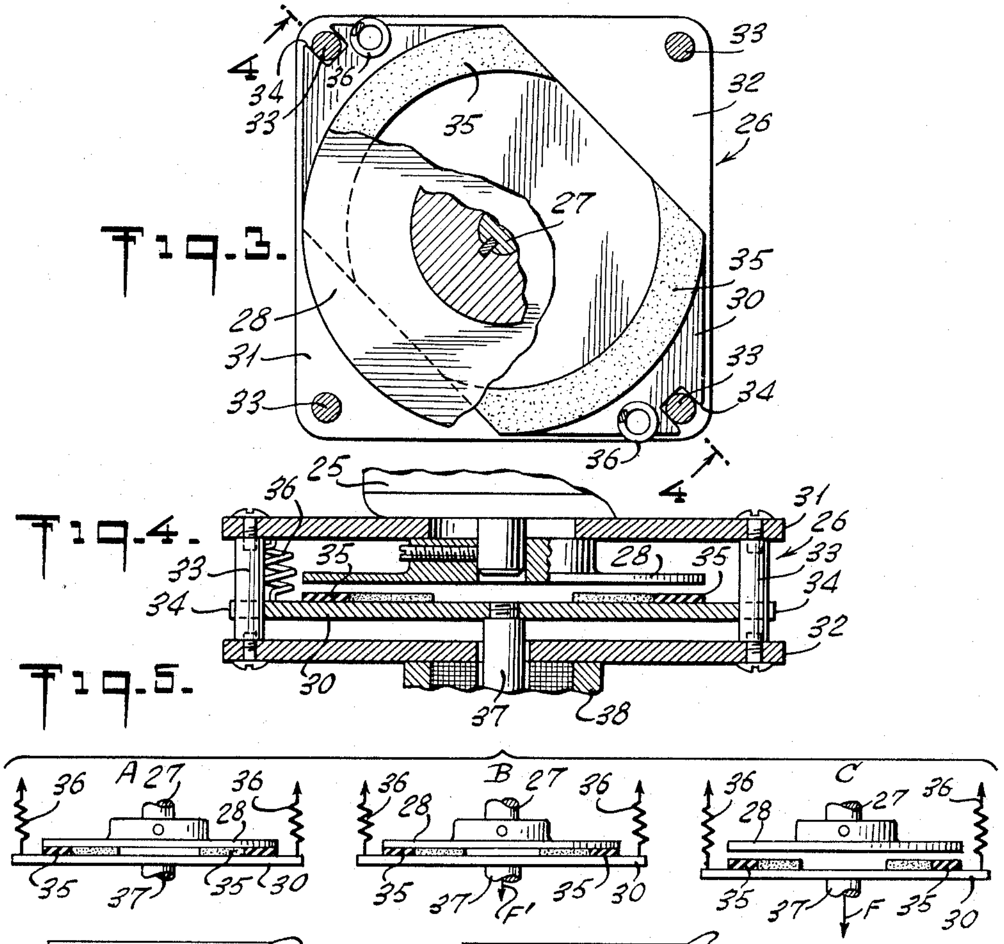
FIG. 3 is a section view taken along the line 3—3 of FIG. 2 illustrating parts of one of the braking mechanism shown in FIG. 2 on an enlarged scale.
FIG. 4 is a section view taken along the line 4—4 of FIG. 3.
FIG. 5 is a diagrammatic illustration showing different braking conditions for the brake mechanism shown in FIGS. 3 and 4; namely, A the fully on position; B the partially on position; and C the released or off position.

As shown best in FIGS. 3 and 4, each of the reel motors has a shaft 27 which extends from the rear thereof and a disc-shaped brake member 28 which is secured to the motor shaft, rotates therewith in operation of the motor. A frame 29 which is secured to the rear of the motor housing, carries a braking plate 30 which is supported in opposing relation to the rotatable brake disc and which is movable vertically into and out of braking engagement therewith. The frame includes a pair of plates 31 and 32 which may be rectangular in shape and which are held in spaced relation by posts 33 at their corners. The rotatable brake disc and the movable brake plate are located within the space between the two plates and the ends of the movable brake plate contains notches 34 which extend around the spacing posts at diagonally opposite corners of the frame to prevent rotation of the movable brake plate when it is in engagement with the rotatable brake disc.

The upper surface of the movable brake plate which opposes the rotatable brake disc is provided with arcuate segments 35 of friction material which engage with the brake disc when a braking force is being applied thereto. A pair of coil springs 36 extend between the upper plate of the frame and the movable brake plate and normally urge the movable brake plate into engagement with the brake disc carried by the motor shaft. This is the condition which exists as to both brakes only when all power is cut off from the tape transport mechanism.

The movable brake plate is connected to a plunger 37 of a solenoid 38 which is carried by the lower plate of the frame and which is arranged to exert a force on the movable brake plate in opposition to the coil springs when the solenoid is energized. When the solenoid is deenergized, no force is applied to the movable brake plate by the plunger and full braking force is applied to the rotatable brake disc by the movable braking plate under the influence of the coil springs as indicated at A of FIG. 5.

The breaking force which is applied to the rotatable brake disc may be reduced without fully releasing the brake by energizing the solenoid to supply a force F′ to the plunger which counteracts part of the force exerted by the springs, but does not fully overcome the spring forces as indicated at B of FIG. 5. The energization of the solenoid can be readily regulated and thus, the partial braking force which is exerted under these conditions can be controlled without difficulty. In this connection, it should be noted that the partial braking condition will apply to a reel which is acting as a take-up reel when movement of the tape is stopped.

When the tape is being moved (in either direction for normal operation or fast rewind or advance), the brakes are fully released as represented at C in FIG. 5. Under these conditions the solenoid is energized to provide a force F which will overcome the spring forces and move the movable plate out of engagement with the rotatable brake disc.

Figure 6:
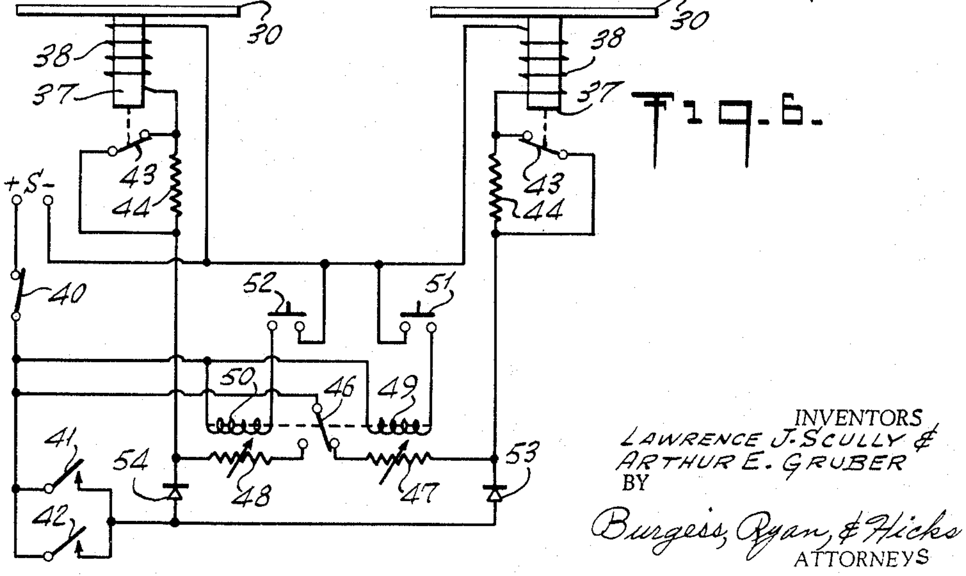
FIG. 6 is a schematic wiring diagram of an electrical circuit for controlling operation of the braking system embodying the invention as illustrated in FIGS. 1–5.

Operation of the brake mechanisms described above is automatically controlled by means of a control circuit as shown in FIG. 6. As illustrated, the control circuit has been set for operation under conditions where the solenoid at the left acts on the brake mechanism for the pay-off reel and the solenoid at the right acts on the brake mechanism for the take-up reel.

The control circuit includes a main switch 40 which is closed to place the tape transport mechanism in condition for operation. After the main switch has been closed, the brake mechanisms are placed in condition to permit operation of the tape transport by closing either a play (or record) switch 41 or a fast (rewind or advance) switch 42. The closing of one of these switches connects the solenoids to a suitable source of electrical energy S and causes both brake mechanisms to be released (as represented at C in FIG. 5. It will be noted that movement of the plungers upon energization of the solenoids to release the brake mechanisms opens switches 43 which shunt resistances 44 connected in series with the solenoids. These resistances reduce the voltage which was initially applied to actuate the solenoids to a point where the solenoids will remain in retracted position. This reduces excessive heating of the solenoids and also renders them more sensitive or responsive to subsequent changes in voltage, particularly in the case where a reduced voltage for partial braking is applied to one of the solenoids.

This condition (brakes released) will prevail until such time as a stop button 45 (see FIG. 1) which opens the closed play or fast switch, has been depressed. When the closed play or fast switch, as the case may be, is opened, the circuit connecting the solenoid acting on the brake mechanism for the pay-off reel is deenergized and the brake is fully applied as represented at A in FIG. 5. However, the solenoid acting on the brake mechanism for the take-up reel continues to be connected to the source of energy through a relay-controlled switch 46 and an adjustable resistance 47 and the voltage applied thereto is reduced so that the brake associated therewith is not fully applied, as represented at B in FIG. 5.

The amount of braking force applied to the take-up reel under these conditions can be readily adjusted by changing the value of the resistance so that the breaking point of the tape will not be exceeded while permitting excess tape to be picked up by continued movement of the take-up reel.

The relay-controlled switch is a double pole switch and in its other position, it connects the other solenoid (which will then be acting on the brake mechanism for the take-up reel) to the source of electrical energy through a second adjustable resistance 48. The relay-controlled switch is positioned by means of relays 49 and 50 which are activated respectively, by the closing of a push button switch 51 or 52. The relays are of the latching type and will remain in their set position until the opposing relay has been activated.

In order to prevent the flow of current from the solenoid to which a partial or reduced voltage is supplied to the deenergized solenoid, diodes 53 and 54, respectively, are connected in the leads connecting the solenoids to the play or fast switches and are arranged to block current flowing from one solenoid to the other when the play and the fast switches are open.

It will be understood that other electrical circuits (not shown) for operating the motors driving the tape transport reels and the like will be controlled in conjunction with the operation of the various switches mentioned above. However, such circuits are of a conventional nature and need not be described in detail here.

It will also be understood that various modifications and changes may be made by those skilled in the art in the particular embodiment of the invention which has been illustrated and described herein without departing from the scope of the invention as defined by the following claims.

We claim:

1. A system for differentially braking the tape transport reels of a tape transport mechanism, which comprises:

(*a*) a pair of tape transport reels;
(*b*) a motor connected to each of said reels;
(*c*) a solenoid actuated brake mechanism acting on each of said motors;
(*d*) electrical circuit means for energizing both of the solenoid actuated brake mechanisms to release each of the brake mechanisms; and
(*e*) electrical circuit means for reducing the voltage supplied to one of the solenoid brake mechanisms when the other solenoid actuated brake mechanism is de-energized.

2. In a system for applying a different braking force to a tape transport mechanism having a pair of tape transport reels and a motor connected to each of said reels, the improvement which comprises:

(*a*) a brake mechanism associated with each of the motors;
(*b*) each of said brake mechanisms including,
(*c*) a brake plate which is movable into braking engagement with the motor,
(*d*) at least one spring acting on said movable brake plate and normally urging said brake plate into full braking engagement with the motor,
(*e*) a solenoid plunger connected to said movable brake plate,
(*f*) a solenoid acting on said plunger and when energized exerting a force thereon in opposition to the braking force exerted on the movable brake plate by the spring.

3. In a system for applying a different braking force to a tape transport mechanism having a pair of tape transport reels and a motor connected to each of said reels, the improvement which comprises:

(*a*) a break mechanism associated with each of the motors;
(*b*) each of said brake mechanisms including,
(*c*) a brake plate which is movable into braking engagement with the motor,
(*d*) at least one spring acting on said movable brake plate and normally urging said brake plate into full braking engagement with the motor, (e) a solenoid plunger connected to said movable brake plate, (f) a solenoid acting on said plunger and when energized exerting a force thereon in opposition to the braking force exerted on the movable brake plate by the spring, (g) said solenoid being selectively energizable to oppose part of the braking force exerted on the movable brake plate by the spring and to overcome the braking force exerted on the movable brake plate by the spring, (h) means for energizing the solenoids acting on brake mechanisms for both motors to an extent sufficient to overcome the braking forces exerted by the springs acting on the movable brake plates for the respective motors; and (i) means for selectively energizing one of the solenoids to an extent sufficient to overcome part of the braking force exerted on one of the movable brake plates by one of the springs, (j) said last-mentioned means including a pair of adjustable resistances, each of which is arranged to be connected in series with one of the solenoids.

4. In a system for applying a different braking force to a tape transport mechanism having a pair of tape transport reels and a motor connected to each of said reels, the improvement which comprises:

(a) a brake mechanism associated with each of the motors;

(b) each of said brake mechanisms including, (c) a brake plate which is movable into braking engagement with the motor, (d) at least one spring acting on said movable brake plate and normally urging said brake plate into full braking engagement with the motor, (e) a solenoid plunger connected to said movable brake plate, (f) a solenoid acting on said plunger and when energized exerting a force thereon in opposition to the braking force exerted on the movable brake plate by the spring, (g) said solenoid being selectively energizable to oppose part of the braking force exerted on the movable brake plate by the spring and to overcome the braking force exerted on the movable brake plate by the spring, (h) means for energizing the solenoids acting on brake mechanisms for both motors to an extent sufficient to overcome the braking forces exerted by the springs acting on the movable brake plates for the respective motors;

(i) means for selectively energizing one of the solenoids to an extent sufficient to overcome part of the braking force exerted on one of the movable brake plates by one of the springs, (j) said last-mentioned means including a pair of adjustable resistances, each of which is arranged to be connected in series with one of the solenoids, and (k) a relay-controlled switch for selectively connecting the adjustable resistances in series with the respective solenoids in accordance with the direction in which the tape is being moved.

5. An electro-mechanical brake for a tape transport mechanism, which comprises:

(a) a rotatable brake disc;

(b) a braking plate opposing said rotatable brake disc and being movable into and out of braking engagement therewith;

(c) spring means acting on said movable braking plate and normally urging said plate into braking engagement with the rotatable brake disc;

(d) a solenoid plunger connected to the movable braking plate;

(e) a solenoid acting on said plunger;

(f) said solenoid, when energized, exerting a force on the plunger in opposition to the force exerted on the movable braking plate by the spring means; and (g) means for selectively energizing the solenoid to overcome part of the force exerted on the movable braking plate by the spring means and to overcome all of the force exerted on the movable braking plate by the spring means.

6. An electro-mechanical brake for a tape transport mechanism, which comprises:

(a) a rotatable brake disc;

(b) a braking plate opposing said rotatable brake disc and being movable into and out of braking engagement therewith;

(c) means engaging with said movable braking plate and preventing rotation thereof under the influence of the rotatable brake disc;

(d) spring means acting on said movable braking plate and normally urging said plate into braking engagement with the rotatable brake disc;

(e) a solenoid plunger connected to the movable braking plate;

(f) a solenoid acting on said plunger;

(g) said solenoid, when energized, exerting a force on the plunger in opposition to the force exerted on the movable braking plate by the spring means; and (h) means for selectively energizing the solenoid to overcome part of the force exerted on the movable braking plate by the spring means and to overcome all of the force exerted on the movable braking plate by the spring means.

7. An electro-mechanical brake for a tape transport mechanism having a tape transport reel and motor connected thereto, which comprises:

(a) a motor, (b) said motor having a housing and a shaft extending therefrom;

(c) a frame attached to the motor housing, (d) said frame including a pair of spaced plates with the motor shaft extending through an opening in one of the plates;

(e) a brake disc secured to the motor shaft;

(f) said disc being located between the spaced frame plates and being rotatable with the motor shaft;

(g) a movable braking plate mounted between the spaced frame plates in opposing relation to the rotatable brake disc;

(h) said movable plate being held against rotation by the frame;

(i) spring means acting on the movable braking plate and normally urging said movable plate into braking engagement with the rotatable brake disc;

(j) a solenoid plunger carried by the movable braking plate;

(k) a solenoid carried by one of the spaced frame plates and acting on said plunger; and (l) means for selectively energizing said solenoid so as to exert different forces on the plunger in opposition to the force exerted on the movable braking plate by the spring means.

8. An electro-mechanical brake for a tape transport mechanism as defined in claim 7 wherein (a) the spring means acting on the movable braking plate comprises a pair of coil springs, (b) said coil springs being connected between the movable braking plate and one of the spaced frame plates so as to exert braking pressure urging the movable plate into engagement with the rotatable brake disc.

9. An electro-mechanical brake for a tape transport mechanism having a tape transport reel and motor connected thereto, which comprises:

(a) a motor, (b) said motor having a housing and a shaft extending therefrom;

(c) a frame attached to the motor housing, (d) said frame including a pair of spaced plates with the motor shaft extending through an opening in one of the plates;

(e) a brake disc secured to the motor shaft;

(f) said disc being located between the spaced frame plates and being rotatable with the motor shaft;

(g) a movable braking plate mounted between the spaced frame plates in opposing relation to the rotatable brake disc;

(h) said movable plate being held against rotation by the frame;

(i) spring means acting on the movable braking plate and normally urging said movable plate into braking engagement with the rotatable brake disc;

(j) a solenoid plunger carried by the movable braking plate;

(k) a solenoid carried by one of the spaced frame plates and acting on said plunger; and (l) means for selectively energizing said solenoid so as to exert different forces on the plunger in opposition to the force exerted on the movable braking plate by the spring means;

(m) said last mentioned means including an adjustable resistance and a switch for selectively connecting said resistance in circuit with the solenoid.

10. An electro-mechanical brake which comprises:

(a) a rotatable braking disc, (b) a braking plate opposing said rotatable disc and being movable into braking engagement therewith, (c) spring means acting on said movable braking plate and urging said plate into braking engagement with the rotatable disc, and (d) a brake releasing solenoid, (e) said solenoid including a plunger, (f) said plunger being connected to the movable braking plate; and (g) means for applying different voltages to the solenoid whereby the plunger and the braking plate are moved to different braking positions in opposition to the braking force exerted by said spring means.

References Cited in the file of this patent

UNITED STATES PATENTS

| | | |
|---|---|---|
| 2,967,673 | Fujii | Jan. 10, 1961 |
| 2,983,339 | Neff | May 9, 1961 |